(12) United States Patent
Chen

(10) Patent No.: US 7,021,650 B2
(45) Date of Patent: Apr. 4, 2006

(54) COLLAPSING DEVICE FOR CARRIER

(75) Inventor: Shun-Min Chen, Taipei (TW)

(73) Assignee: Wonderland Nurserygoods Co., Ltd., (TW)

( * ) Notice: Subject to any disclaimer, the term of this patent is extended or adjusted under 35 U.S.C. 154(b) by 257 days.

(21) Appl. No.: 10/636,126

(22) Filed: Aug. 7, 2003

(65) Prior Publication Data

US 2005/0029775 A1    Feb. 10, 2005

(51) Int. Cl.
    *B62B 7/06* (2006.01)
(52) U.S. Cl. .................. 280/642; 280/647; 280/650
(58) Field of Classification Search ............... 280/638, 280/639, 38, 641, 642, 643, 645, 646, 42, 280/647, 648, 650, 657, 658, 659
    See application file for complete search history.

(56) References Cited

U.S. PATENT DOCUMENTS

| 5,979,928 A | * | 11/1999 | Kuo | 280/642 |
| 6,068,284 A | * | 5/2000 | Kakuda | 280/642 |
| 6,129,373 A | * | 10/2000 | Cheng | 280/647 |
| 6,339,862 B1 | * | 1/2002 | Cheng | 16/113.1 |
| 6,443,479 B1 | * | 9/2002 | Huang | 280/642 |
| 6,478,328 B1 | * | 11/2002 | Yeh et al. | 280/650 |
| 6,860,504 B1 | * | 3/2005 | Suga et al. | 280/642 |
| 6,877,760 B1 | * | 4/2005 | Wang | 280/642 |

FOREIGN PATENT DOCUMENTS

GB          2329671          3/1999

* cited by examiner

*Primary Examiner*—Christopher P. Ellis
*Assistant Examiner*—Brian Swenson
(74) *Attorney, Agent, or Firm*—Gauthier & Connors LLP

(57) ABSTRACT

A collapsing device for a carrier can collapse the frames of a stroller with only one hand. The collapsing device mainly comprises a first cover, a second cover, a button partially interposed between the first and the second cover, a safety lock and two pins. It is with only one hand that a user presses the safety lock and simultaneously pushes the button into the interior defined by the first and the second covers to make the pins cooperate the steel cables further releasing a latch mechanism equipped at the frames so that the collapsing operations can be easily accomplished.

2 Claims, 4 Drawing Sheets

COLLAPSING DEVICE FOR CARRIER

FIELD OF THE INVENTION

The present invention relates generally to a collapsing device for a carrier, and more particularly to a collapsing device which can be operated by only one hand to collapse the frames of a carrier.

BACKGROUND OF THE INVENTION

In conventional stroller, when the frames of the stroller are collapsed, it is necessary to hold the handlebar with one hand and operate a latch mechanism provided at the frame with the other hand so as to make the front wheel frame and the back wheel frame pivotally rotate each other to reach a collapsed state.

However, when the user holds something or an infant in one hand and no other can help her/him, it is difficult for her/him to collapse the frames only with the other hand.

SUMMARY OF THE INVENTION

Accordingly, the present invention relates to a collapsing device for a carrier that can substantially obviate one or more of the problems due to the limitations and disadvantages of the related arts.

One object of the present invention is the provision of a collapsing device for a carrier which can be operated with one hand.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, a collapsing device for a carrier comprises a shell, a button and a pairs of pins. The shell further comprises a first cover and a second cover which are connected with each other by a fixing element. Each of the covers correspondingly has a pair of transverse grooves laterally arranged on respective inner surface. The button is partially accommodated and longitudinally slides in the shell. A pair of inclined slots perpendicularly penetrate a surface along which the button slides. The pins respectively penetrate the inclined slots of the button. Both ends of the pins are movably received in the corresponding grooves of the first cover and the second cover. The pins are respectively connected with a cable for controlling a remote collapsing joint. By longitudinally pressing the button into the shell, the pins are transversely moved and simultaneously cooperate the cables in order to control the collapsing joint.

It is preferred that the collapsing device further comprises a safety lock pivotally connected onto an outer surface of the second cover. The safety lock comprises a push portion and a projection. An elastic element is installed between the push portion and an outer surface of the second cover so as to permit the push portion being repeatedly pressed relative to the second cover. The projection is engaged into a slit on an outer surface of the button by a restoration force of the elastic element.

Alternatively, the shell further comprises a space therein defined by the first cover and the second cover for receiving a bar transversely passing through.

The collapsing device according to the present invention not only can be equipped at the stroller, but also can be installed at collapsible push car for carrying something or the like.

It is to be understood that both the forgoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

The term of 'carrier' comprises stroller, perambulator, push car, vehicle and the like.

Figure 1:
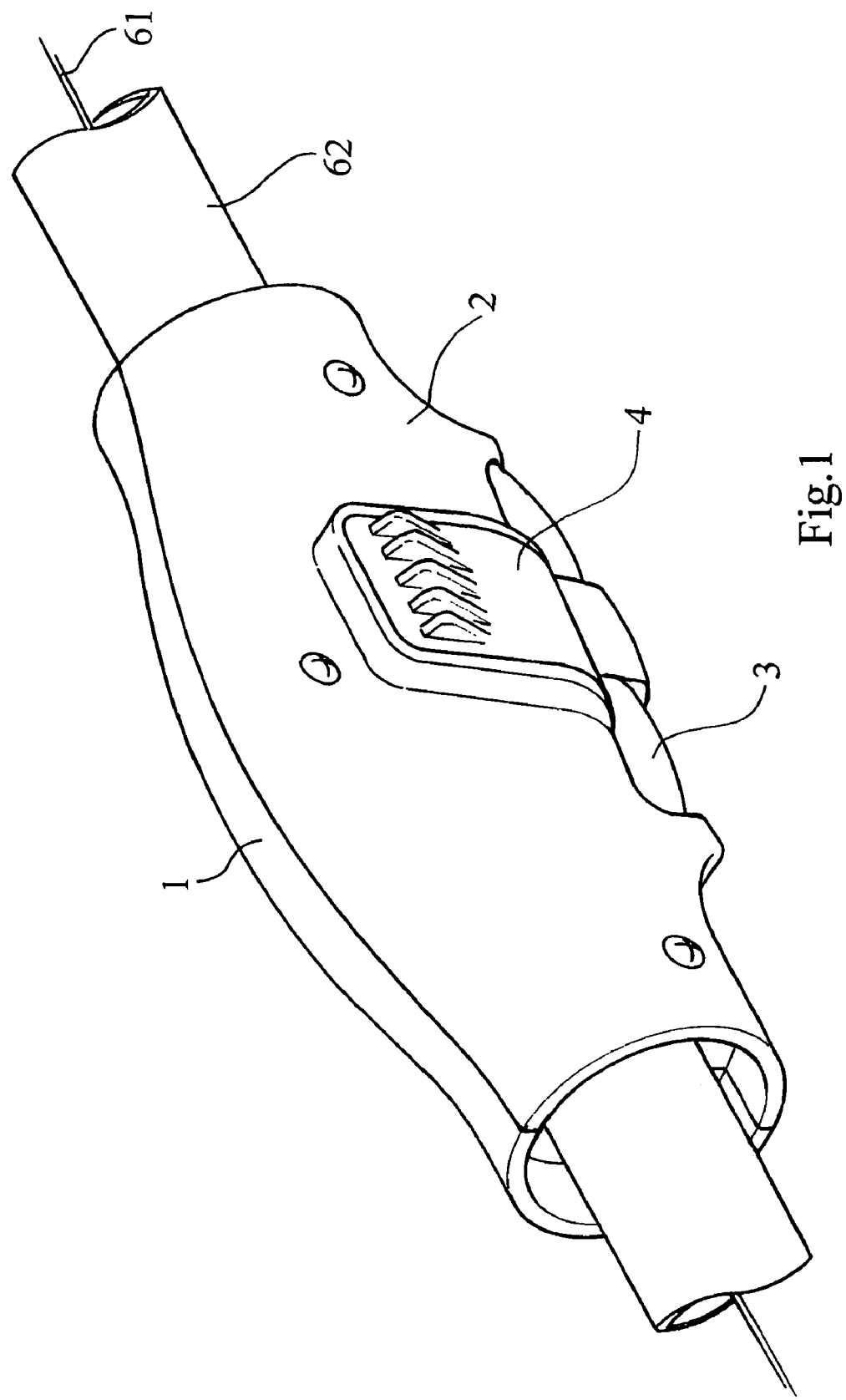
FIG. 1 is an assembled perspective view illustrating a preferred embodiment of the collapsing device installed at the handlebar of a carrier such as a stroller according the present invention.
Figure 2:
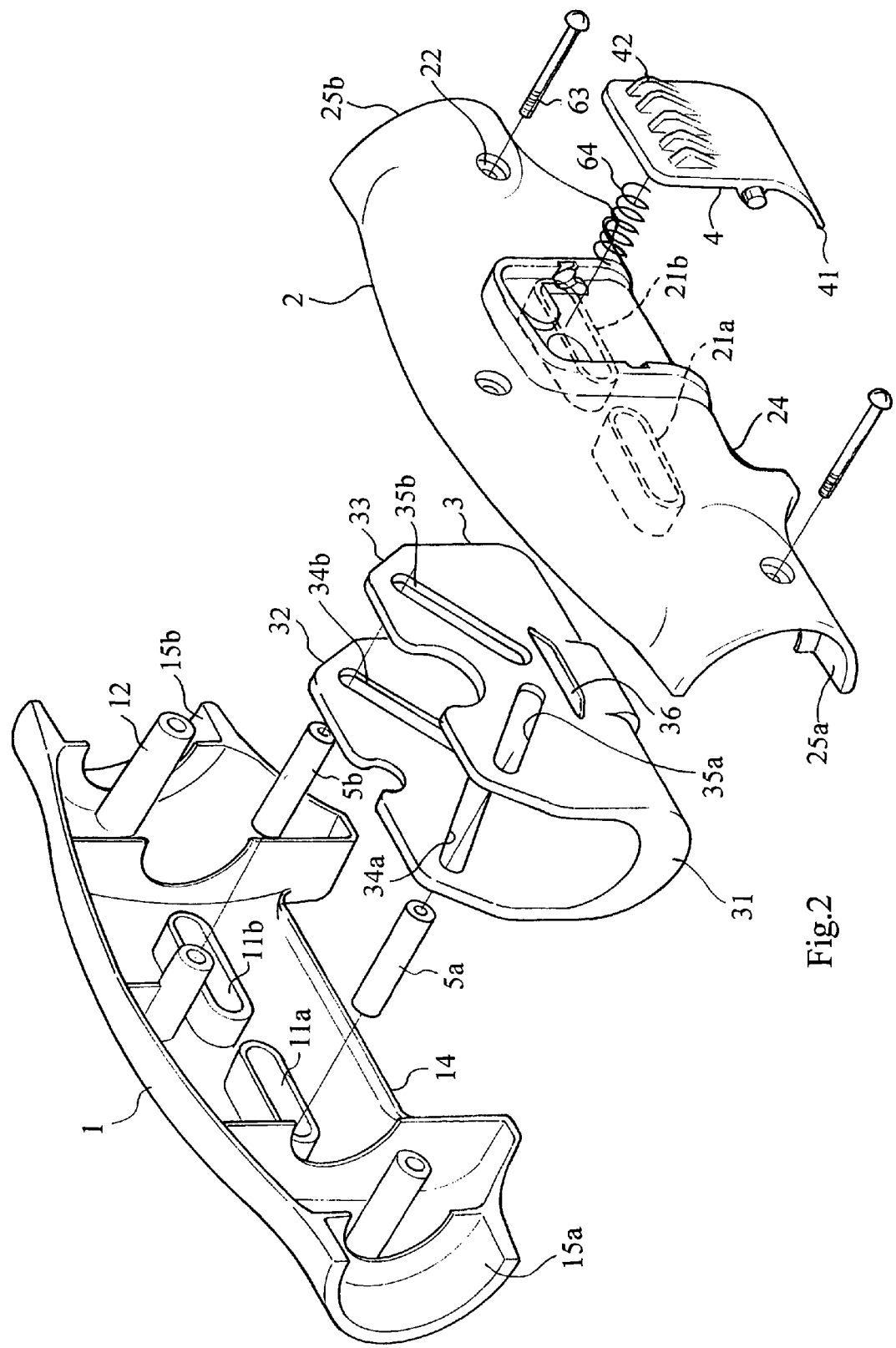
FIG. 2 is an exploded perspective view of the collapsing device for a carrier according the present invention.

As shown in FIGS. 1 and 2, a collapsing device for a carrier according to the present invention comprises a first cover 1, a second cover 2, a button 3 and two pins 5a, 5b.

Figure 3:
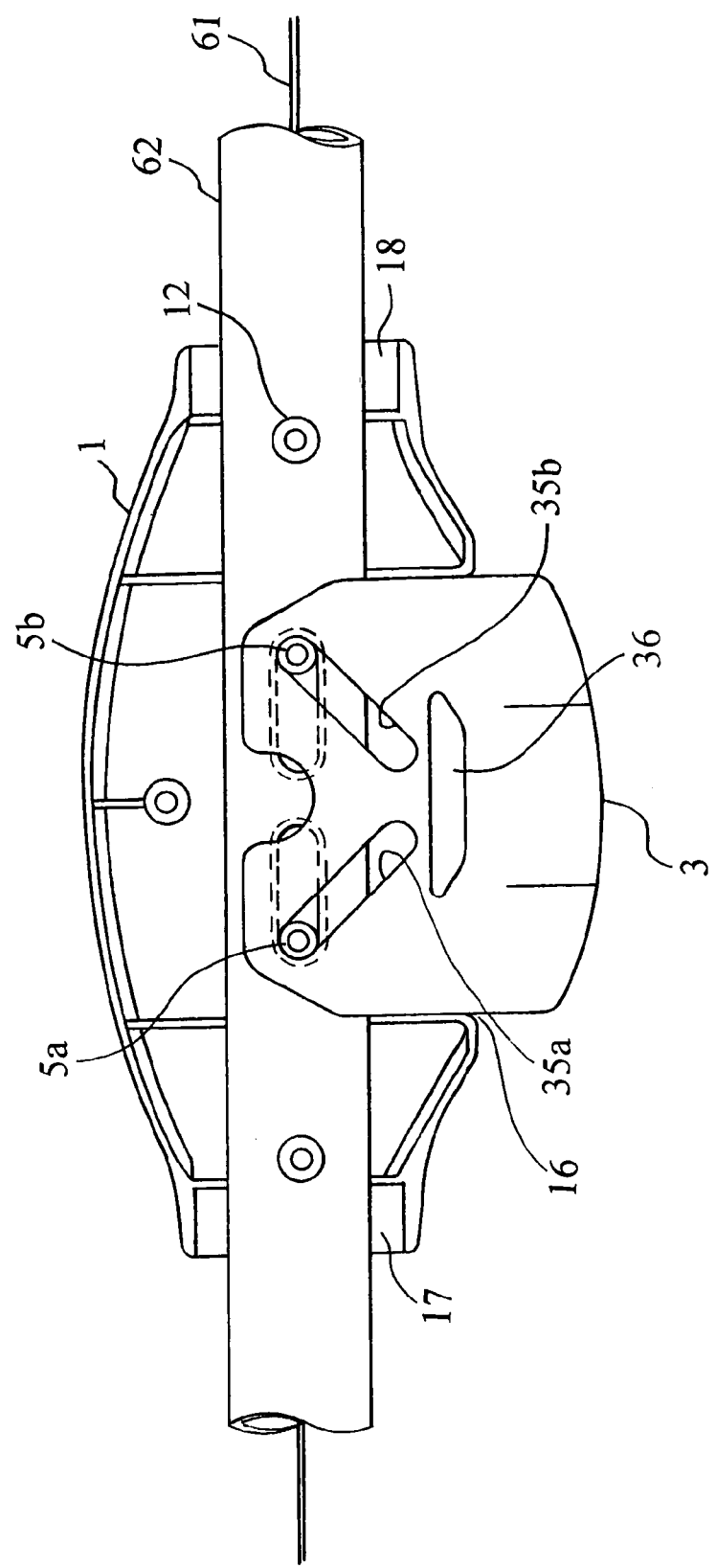
FIG. 3 is a partially plan view of the collapsing device for a carrier according the present invention illustrating the position of a button when the stroller is stretched.

The first cover 1 and the second cover 2 are symmetrical in the form. Each cover 1, 2 is correspondingly configured with two adjacent grooves 11a, 11b, 21a, 21b laterally arranged on inner surface thereof. Each cover 1, 2 has a first recess 14, 24 for constructing a first opening 16, a second recesses 15a, 25a for constructing a second opening 17 situated at left side of the collapsing device, and a third recesses 15b, 25b for constructing a third opening 18 situated at right side of the collapsing device. When two covers 1, 2 are connected together and then form a shell, these covers 1, 2 define a space therein for receiving a handlebar 62 passing through the second opening 17 and third opening 18 as shown in FIG. 3. The first cover 1 is provided with a plurality of screw seats 12 on its inner side. The second cover 2 is equipped with a plurality of holes 22 respectively corresponding to the screw seats 12 of the first cover 1. The first cover 1 and the second cover 2 are fixedly connected by using a plurality of fixing elements, such as screws 63, respectively penetrating the holes 22 and fixing to the screw seats 12.

As shown in FIG. 2, a button 3 has a U-shaped cross section and is movably received at the first opening 16 formed by the first recesses 14, 24 of the first cover 1 and the second cover 2. The button 3 includes a first wall 32, a second wall 33, and a bridge portion 31 connecting the first wall 32 and the second wall 33. The first wall 32 and the second wall 33 respectively have first inclined slots 34a, 35a and second inclined slot 34b, 35b respectively symmetric to the first inclined slots 34a, 35a. The first inclined slots 34a, 35a and the second inclined slot 34b, 35b is closer at the end near the bridge portion 31 and farer at the other end thereof. In addition, the second wall 33 is formed with a slit 36 on its outer surface.

The curve-sheeted safety lock 4 is pivotally connected to outer surface of the second cover 2 to lock the button 3 in a state of the stroller being stretched. The safety lock 4 comprises a projection 41 extending to front of the first opening 16 and a push portion 42 at the other end of the safety lock 4. When the stroller is stretched, the projection 41 is engaged into the slit 36 of the button 3, as shown in FIGS. 2 and 3. An elastic element 64 is installed between the push portion 42 and outer surface of the second cover 2 to permit the push portion 42 being able to be repeatedly pressed relative to the second cover 2.

As shown in FIGS. 2 and 3, the pins 5a, 5b are respectively connected to the latch mechanism of a remote collapsing joint (not shown) by two steel cables 61. One pin 5a penetrates the first inclined slots 34a of the first wall 32 and the first inclined slots 35a of the second wall 33 and both ends of the pin 5a are respectively and movably fitted in the first groove 11a of the first cover 1 and the first groove 21a of the second cover 2. The other pin 5b passes the second inclined slots 34b of the first wall 32 and the second inclined slots 35b of the second wall 33 and both ends of the pin 5b are respectively and movably fitted in the second groove 11b of the first cover 1 and the second groove 21b of the second cover 2.

By means of the combination of the above elements, as shown in FIG. 3, when the stroller is stretched, the pins 5a, 5b are respectively situated at the farer ends of the first inclined slots 34a, 35a, the second inclined slots 34b, 35b and the grooves 11a, 21a, 11b, 21b, the button 3 extremely protrudes out of the first opening 16, and the projection 41 is engaged into the slit 36 of the second wall 33 of the button 3.

Figure 4:
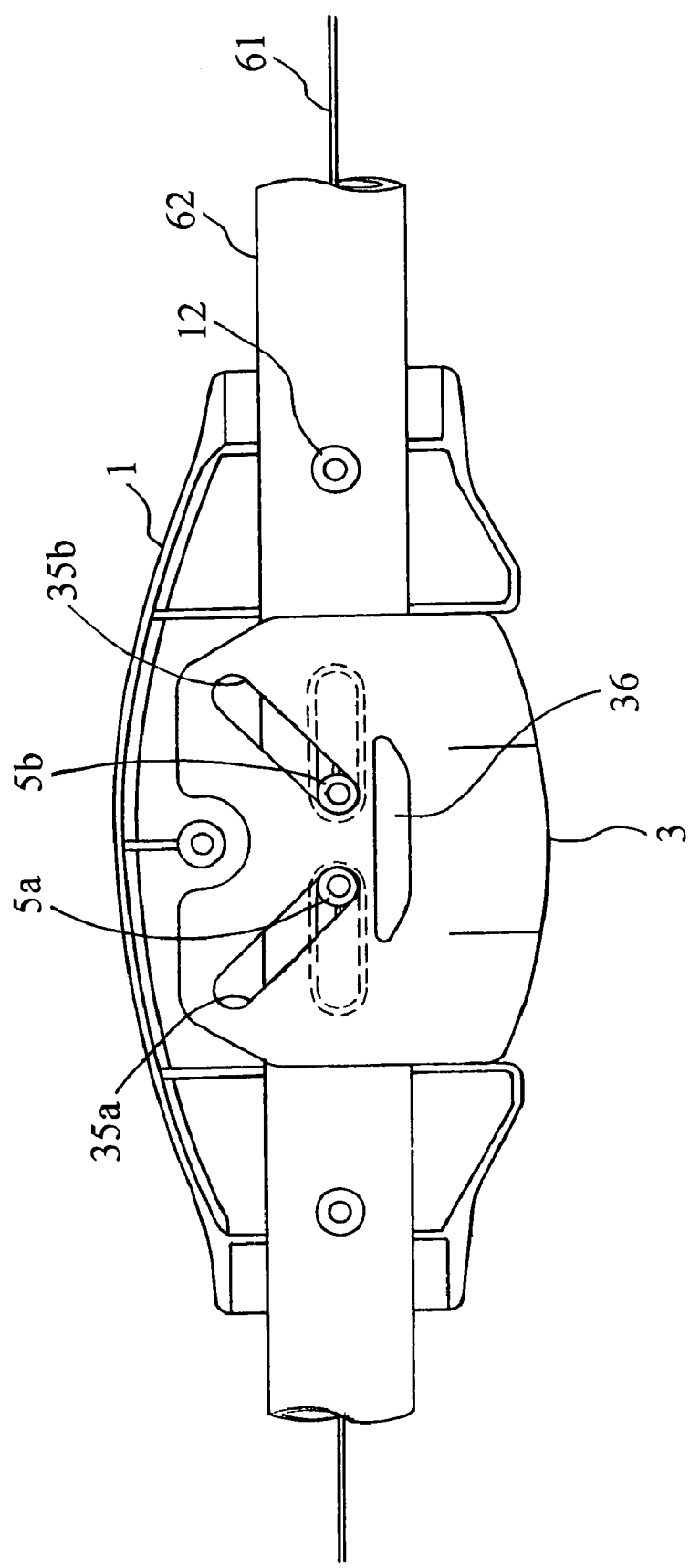
FIG. 4 is a partially plan view of the collapsing device for a carrier according the present invention illustrating the position of a button when the stroller is collapsed.

As shown in FIG. 4, when it is desired to collapse the stroller, at first, the push portion 42 of the safety lock 4 is pressed to the extent that the projection 41 of the safety lock 4 escapes from the slit 36. Next, the button 3 is pressed into the first opening 16 of the first cover 1 and the second cover 2 and make the pins 5a, 5b respectively move along the first inclined slots 34a, 35a and the second inclined slots 34b, 35b to the closer ends thereof. Under guidance of the inclined slot 34a, 35a, 34b, 35b and exertion of the button 3, the pins 5a, 5b closely slide along the first grooves 11a, 21a and the second grooves 11b, 21b and simultaneously cooperate the latch mechanism of the collapsing joint by means of the cables 61 to collapse the frames of the stroller. In other word, the longitudinal motion of the button 3 is shifted to the transverse motion of the pins 5a, 5b in the grooves 11a, 21a, 11b, 21b.

On the contrary, when the stroller is adjusted back to the state of being stretched, the pins 5a, 5b slide apart and the button 3 protrudes out of the first opening 16 again to permit the projection 41 of the safety lock 4 snapping into the slit 36 due to exertion of the restoration force resulting from the elastic element 64 installed between the push portion 42 of the safety lock 4 and outer surface of the second cover 2.

This invention has been disclosed in terms of specific embodiments. It will be apparent that many modifications can be made to the disclosed structures without departing from the invention. Therefore, it is the intent of the appended claims to cover all such variations and modifications as come within the true sprit and scope of this invention.

What is claimed is:

1. A collapsing device for a carrier comprising:
   a shell further comprising a first cover and a second cover which are connected with each other by a fixing element, each of the covers correspondingly having a pair of transverse grooves laterally arranged on a respective inner surface;
   a button accommodated and longitudinally sliding in the shell, having a pair of inclined slots perpendicularly penetrating a surface along which the button slides; and
   a pair of pins respectively penetrating the inclined slots of the button, both ends of the pins movably received in the corresponding grooves of the first cover and the second cover, the pins respectively connected with a cable for controlling a remote collapsing joint;
   wherein by longitudinally pressing the button into the shell, the pins are transversely moved and simultaneously cooperate the cables in order to control the collapsing joint;
   the collapsing device further comprising a safety lock pivotally connected onto an outer surface of the second cover, the safety lock comprising:
   a push portion having an elastic element between the push portion and the outer surface of the second cover so as to permit the push portion being repeatedly pressed relative to the second cover; and
   a projection being engaged into a slit on an outer surface of the button by a restoration force of the elastic element; whereby the button is prevented from sliding by engagement of the projection with the slit.

2. A collapsing device for a carrier, comprising:
   a shell further comprising a first cover and a second cover which are connected with each other by a fixing element and define a space for receiving a bar transversely passing through, each cover correspondingly having a pair of transverse grooves on respective inner surface;
   a button accommodated and longitudinally sliding in the shell, having a pair of inclined slots perpendicularly penetrating a surface along which the button slide; and
   a pair of pins respectively penetrating the inclined slots of the button, both ends of the pins movably received in the corresponding grooves of the first cover and the second cover, the pins respectively connected with a cable for controlling a remote collapsing joint;
   wherein by longitudinally pressing the button into the shell, the pins are transversely moved and simultaneously cooperate the cables in order to control the collapsing joint;
   the collapsing device further comprising a safety lock pivotally connected onto an outer surface of the second cover, the safety lock including:
   a push portion, having an elastic element between the push portion and the outer surface so as to permit the push portion being repeatedly pressed relative to the second cover; and
   a projection engaging into a slit on the outer surface by a restoration force of the elastic element; whereby the button is prevented from sliding by engagement of the projection with the slit.

* * * * *